United States Patent [19]
Miller

[11] 3,820,423
[45] June 28, 1974

[54] METHOD FOR CONDITIONING CANS
[75] Inventor: Stanley J. Miller, Chicago, Ill.
[73] Assignee: National Can Corporation, Chicago, Ill.
[22] Filed: Apr. 9, 1973
[21] Appl. No.: 348,932

Related U.S. Application Data
[62] Division of Ser. No. 81,872, Oct. 19, 1970.

[52] U.S. Cl............................ 82/47, 82/82, 82/101
[51] Int. Cl............................ B23b 1/00, B23b 3/04
[58] Field of Search .................... 82/46, 47, 82, 101

[56] References Cited
UNITED STATES PATENTS
1,807,671   6/1931   Phelps..................................... 82/82
2,298,366   10/1942   Gladfelter et al....................... 82/82

Primary Examiner—Harrison L. Hinson
Attorney, Agent, or Firm—Dressler, Goldsmith, Clement & Gordon, Ltd.

[57] ABSTRACT
A method for trimming salvage edges from container ends by axially inserting a cutter into the open end of a container surrounded by a backing member, shifting the cutter transversely of the longitudinal axis of the container and producing relative rotation between the cutter and container to trim salvage edges from the inside to the outside of the container. The apparatus for trimming salvage edges includes an elongated member rotated about an axis and having a plurality of circumferentially spaced trimming stations. Each of the trimming stations includes a fixed backing member having an opening, a container support movable between first and second positions on one side of the backing member, and a cutter supported eccentrically of a shaft on the opposite side of the backing member with the shaft being movable transversely and axially to temporarily align the cutter with the axis of the opening, and position the cutter inside the container in engagement with the container wall so that rotation of the shaft will trim the salvage edge. The cutter is designed to automatically produce an arcuate surface on the inner edge of the container wall during the cutting operation. Camming members cooperate with the shaft and the container support to move the shaft and container support to the various positions during each cycle of rotation of the elongated member.

9 Claims, 6 Drawing Figures

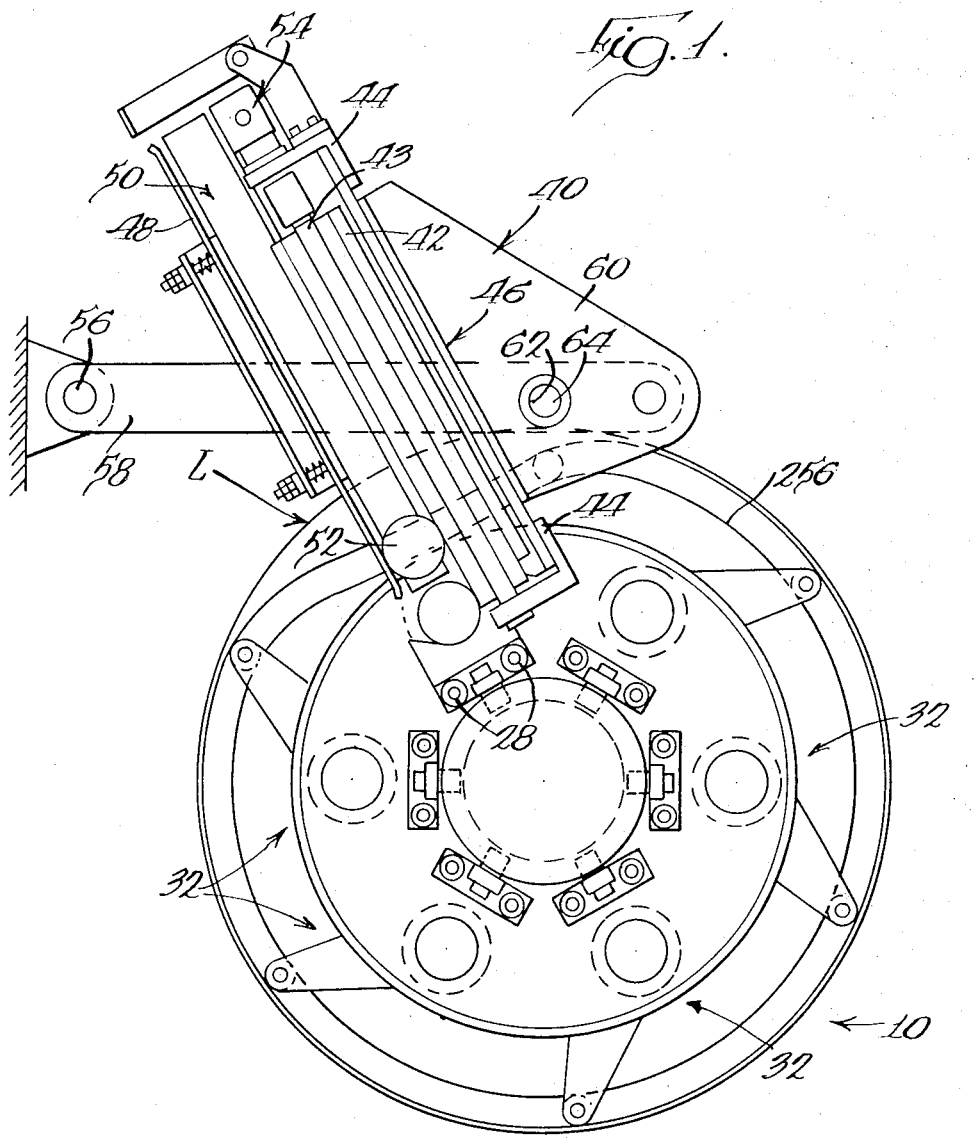

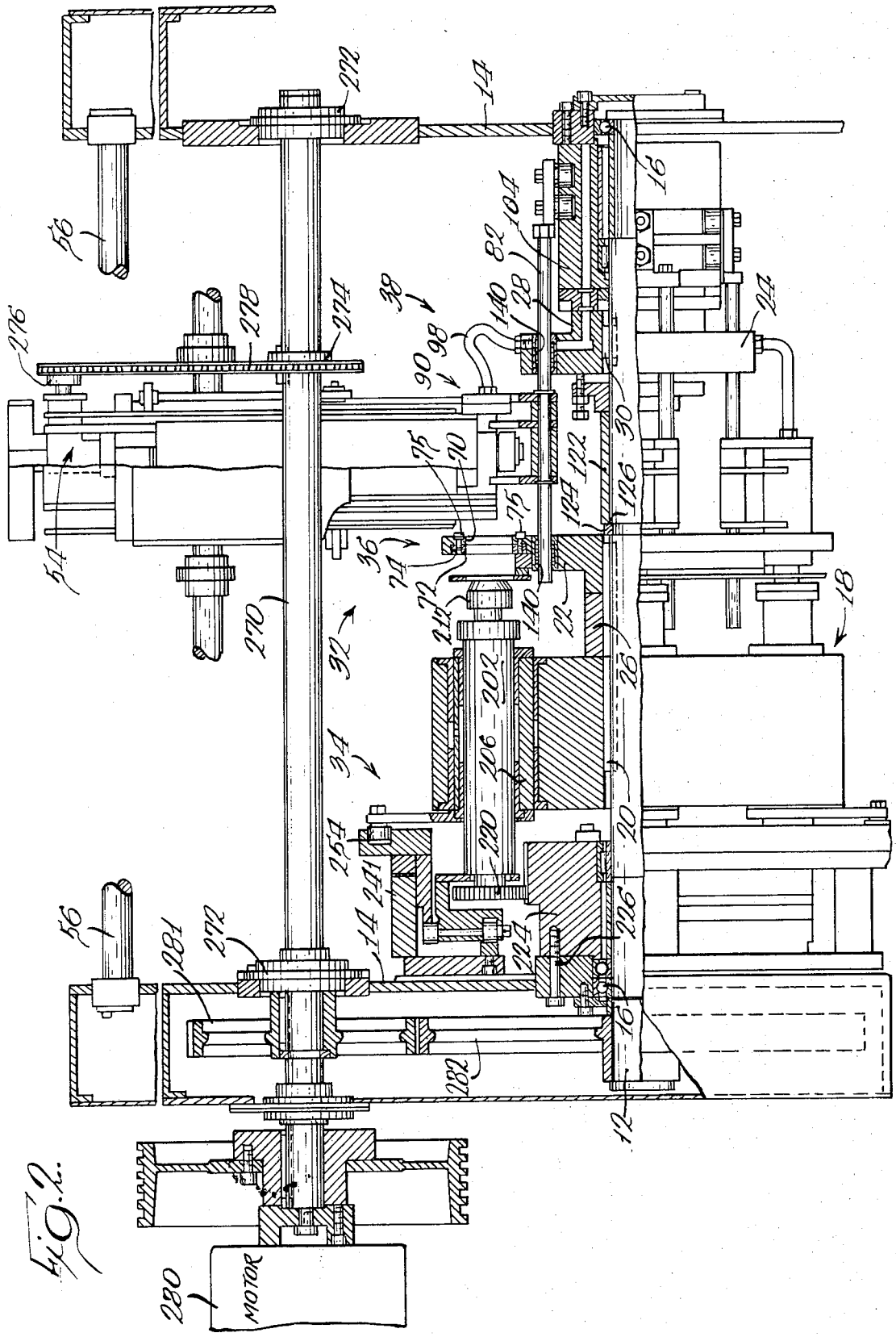

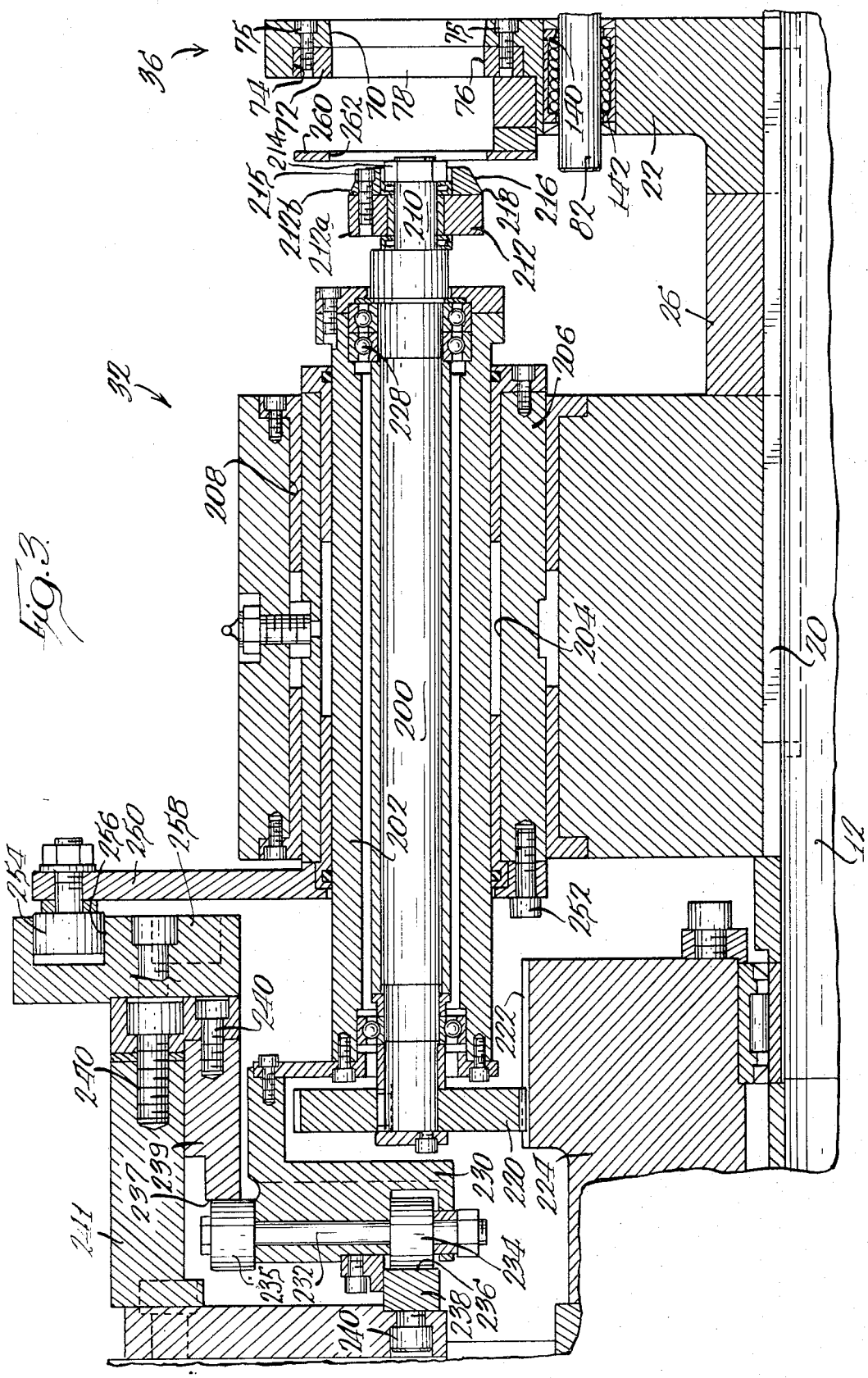

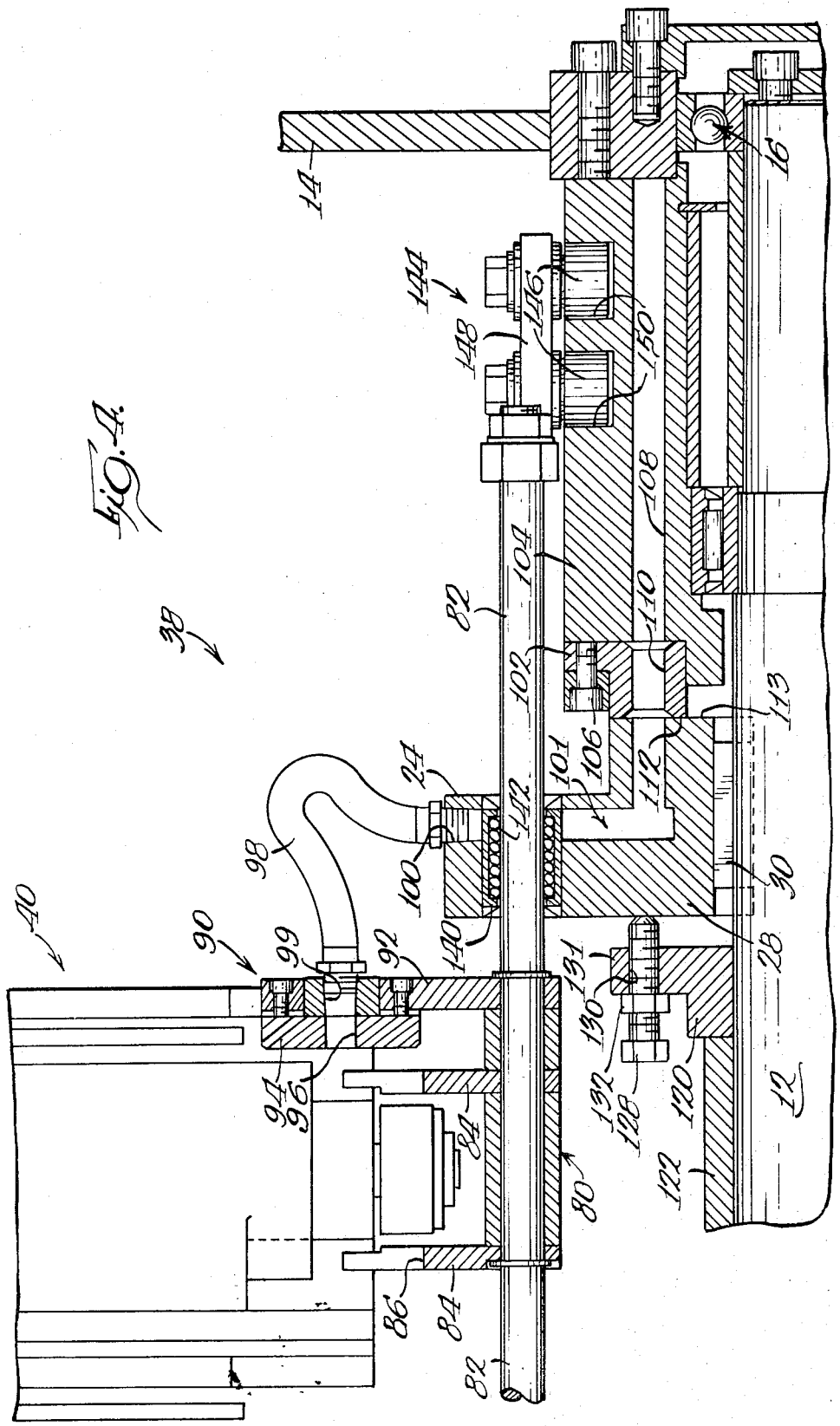

METHOD FOR CONDITIONING CANS

REFERENCE TO RELATED APPLICATIONS

This application is a division of application Ser. No. 81,872, filed Oct. 19, 1970.

BACKGROUND OF THE INVENTION

The present invention relates generally to conditioning cans and more particularly to improved method and apparatus for trimming salvage edges from containers.

One type of container which has been used extensively in recent years is called a two-piece can. In the formation of a can or container of this type, the bottom and side walls of the container are formed by deforming, drawing, and ironing a sheet of metal to produce a substantially circular container having a closed end. Subsequently, the free edge of the container is trimmed to produce a finished edge on a container of predetermined length. Thereafter, the free edge or rim of the container is flanged outwardly so that the flange may subsequently be utilized in connecting an end to the container by the usual double seaming process.

In trimming the salvage edges from the open ends of the containers, it has been customary to position the container on a mandrel or other type of support and force a cutter into engagement with the outer wall of the container while producing relative rotation between the cutter and the mandrel to remove the salvage edge. However, the removal of the salvage edge in this manner produces problems.

One of the problems encountered in trimming salvage edges by an external cutting operation is that any burr or small tear resulting from the cutting operation is located on the inner edge of the upstanding neck of the container wall. Thus, when the upper end or rim is subsequently flanged outwardly, any burring or imperfection on the inner edge will result in a slight tearing of the inner edge because this edge is placed in tension during the flanging operation. The tearing of the container wall on the free end thereof during the flanging operation will result in the possibility of having a "leaker" when the end of the container is subsequently seamed to the main body of the container.

While various attempts have been made to overcome the above problem, to date, no satisfactory solution has been proposed. Thus, there still remains a need for producing a container in a manner that the internal edge of the container wall is free of any imperfection.

SUMMARY OF THE INVENTION

The present invention contemplates method and apparatus for trimming a container having a closed end to the desired length in a manner that the inner edge of the container wall is devoid of any imperfection which tends to produce treating of the container wall during the flanging operation.

In its broadest context, the present invention contemplates trimming the salvage edge from a container by inserting a cutter internally of the container and cutting the salvage edge from the internal wall to the external wall. With such an arrangement, the imperfection or burrs resulting from the cutting operation will be produced on the outer edge of the wall or rim which will greatly reduce the possibility of tearing the upper edge of the container during the flanging operation. By cutting the salvage edge from the inside to the outside of the container, imperfections, if any, such as burrs or tearing, resulting from the cutting operation, will be on the outer edge of the container wall. Since the outer edge of the container wall is placed in compression during the flanging operation, the production of "leakers" is considerably reduced if not completely eliminated.

The apparatus for the trimming of salvage edges in accordance with the present invention includes a cutter supported eccentrically of the axis of a rotating shaft and positioned on one side of a backing member having an opening corresponding to the peripheral dimension of a can, while a can support is located on the opposite side of the backing member. The apparatus further includes means for delivering a can to the can support, mechanism for moving the can and can support towards the backing member to position the end of the can within the opening and means for inserting the cutter into the open end of the can or container and in transverse alignment with an edge on the backing member and shifting the cutter transversely along the plane into engagement with the container wall while producing relative rotation between the cutter and the can to remove the salvage edge.

More particularly, the apparatus of the present invention includes a trimming device rotated about a fixed axis and having a plurality of trimming stations on the periphery thereof, with each trimming station having a backing member, a can support and a cutter. A shaft eccentrically supporting the cutter is rotated in a sleeve which in turn is supported in a bore by a circular member having an eccentric opening receiving the shaft and the sleeve. The circular member is movable between first and second positions in the bore by cam means so as to position the axis of the cutter in alignment with the opening axis during a portion of each cycle of revolution of the trimming device and return the cutter to an eccentric position after the cutter has been inserted into the container end and the opening in the backing member.

While the cutter is aligned with the axis of the opening, a further camming mechanism interposed between a fixed support and the sleeve moves the cutter from a retracted to an extended position to align the cutting edge of the cutter with a back edge on the backing member. The apparatus further includes mechanism for continuously rotating the shaft so that the salvage edge is automatically removed when the cutter is inserted into the container end and is shifted to an eccentric position relative to the axis of the opening.

Each cutting station further includes means for insuring removal of the salvage edge from the cutter when the cutter is moved between the extended and retracted positions. In addition, each cutter incorporates means for producing an arcuate surface between the inner surface and end surface of the container wall while the salvage edge is being removed.

The method of the present invention contemplates the steps of surrounding the container end with the backing member, axially inserting a cutter into the open end of the container, shifting the cutter transversely of the longitudinal axis of the container and into engagement with the container wall and producing relative rotation between the cutter and the container to remove the salvage edge from the container end.

As will be appreciated, inserting the cutter internally of the container and forcing the cutter into engagement with the inner wall will result in an inner edge that is free of any burrs or other imperfections which normally are encountered during the cutting operation of this type. Any burrs or other types of imperfections will necessarily be produced on the outer edge of the container.

BRIEF DESCRIPTION OF THE SEVERAL VIEWS OF DRAWINGS

FIG. 1 is an end view of the trimming apparatus constructed in accordance with the present invention;

FIG. 2 is a side elevation view of the trimming apparatus and partly in section to show the details of one trimming station;

FIG. 3 is an enlarged sectional view of a cutter and its supporting mechanism for one trimming station;

FIG. 4 is an enlarged sectional view of the container support mechanism for one of the trimming stations;

DETAILED DESCRIPTION

Figure 6:
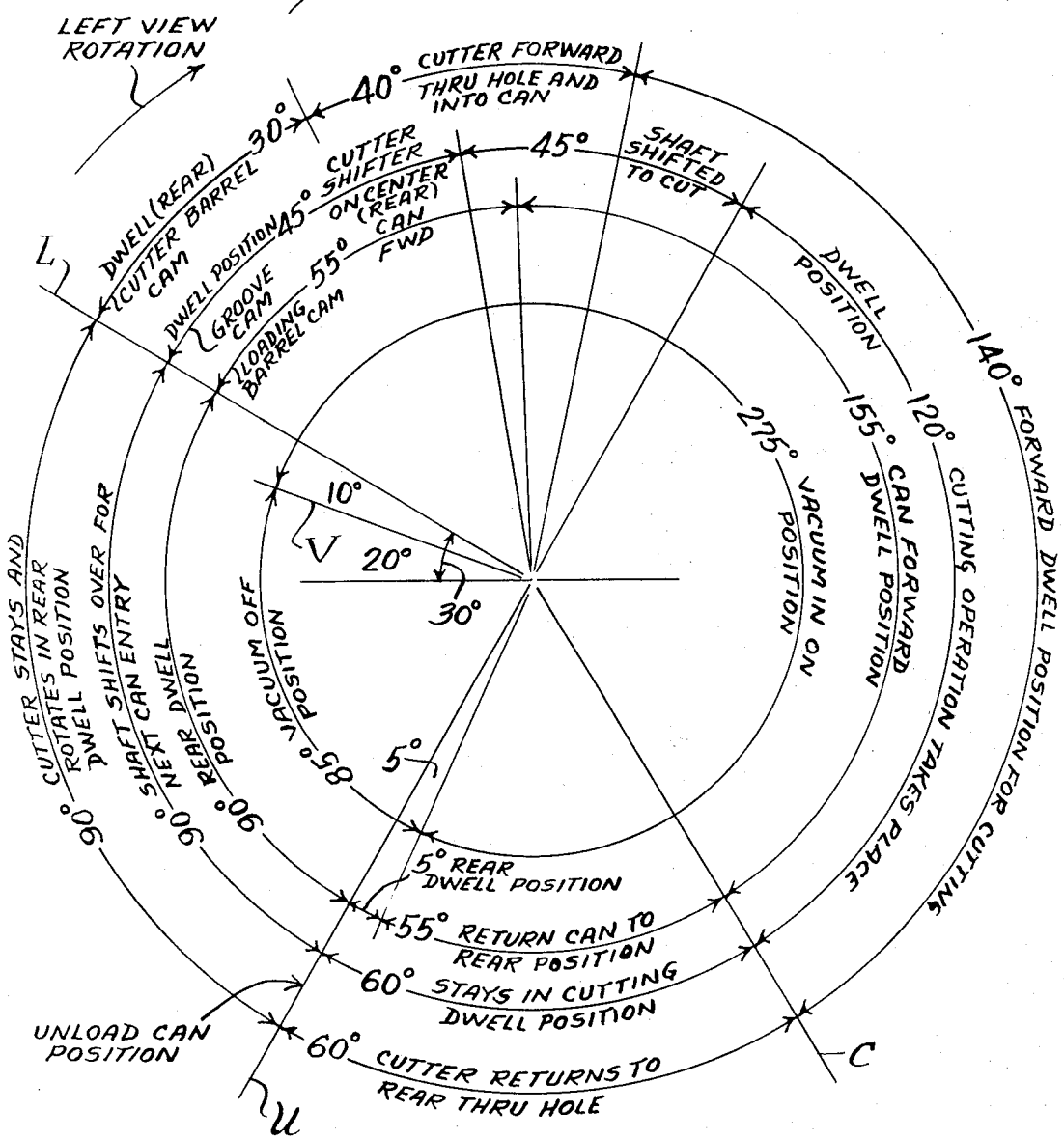
FIG. 6 is a schematic illustration of the movement of the various parts and the position thereof during each cycle of revolution of the trimming device.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIGS. 1 and 2 of the drawings disclose a can trimming apparatus constructed in accordance with the present invention and generally designated by the reference numeral 10. The trimming device consists of a shaft 12 (FIG. 2) supported for rotation at opposite ends on fixed uprights 14 through bearings 16. A member or cutter support mechanism 18 is keyed at 20 to the shaft 12 for rotation therewith. First and second axially spaced flanges 22 and 24 each have hubs 26, 28 respectively secured to the shaft 12 through the key 20 and a second key 30 so that the member 18, the flange 26 and the flange 28 rotate as a unit and may be termed to define an elongated rotating member.

A plurality of cutting stations 32 are located at circumferentially spaced points on the periphery of the rotating member. Each of the cutting stations 32 includes a cutter and supporting mechanism, generally designated as 34 in FIG. 2, cooperating with the member 18, a backing member 36 defined by flange 26 and container support means 38. As more clearly shown in FIG. 2, the cutter and supporting mechanism 34 is located on one side of the backing member 36 and the container support mechanism or means 38 is located on the opposite side of the backing member 36.

As shown in FIG. 1, the trimming device includes means 40 for feeding containers or cans to the container support means at one location on the periphery of the rotating member. In the illustrated embodiment, the means for feeding includes a screw 42 having a shaft 43 supported for rotation at its opposite ends on brackets 44, forming part of a base 46. The screw 42 cooperates with a fixed guide 48 to define an elongated opening 50 through which cans 52 are fed along a path intersecting the periphery of the trimming device. Thus, rotation of the screw 42 in an appropriate direction through suitable drive means 54 (to be described later) will sequentially feed the cans or containers 52 to each of the trimming stations in timed relation to the rotation of the trimming device, as will become more apparent hereinafter.

In order to gain ready access to the entire periphery of the trimming device and to the various parts of the feed means 40, the feed means is preferably supported for pivotal movement by at least one arm 58 rotated about a shaft 56 supported on uprights 14 and spaced from the periphery of the elongated member or drum. The opposite end of arm 58 is connected to an extension 60 extending from the opposite side of the base 46 and with the extension having an opening 62 for receiving a pin 64. A fixed support is defined adjacent the periphery of the trimming device 10 and has a corresponding opening (not shown) so that alignment of the two openings and insertion of a pin 64 will maintain the feed means 40 in fixed relation to the periphery of the trimming device 10. However, if it is desirable to gain access to the periphery of the device 10 or the lower end of the feed means 40, it is only necessary to remove pin 64 and pivot the entire feed means 40 about the shaft or pivot pin 56.

Returning now to the construction of each of the trimming stations (FIG. 3), the backing member 36 has an opening 70 for each of the stations defined in the flange 22 with a backing element 72 received in an enlarged recess 74 defined in one surface of the flange 22 and retained therein by bolts 75. The backing element 72 has opening 76 defining the edge 78 with the opening 76 as well as the opening 70 corresponding in cross-sectional configuration to the peripheral size of the can or container 52, for a purpose that will become apparent hereinafter.

The container support means 38 at each of the trimming stations 32 is more clearly shown in FIG. 4 and includes a cradle 80 fixedly secured to a pair of guide rods 82. The cradle 80 consists of a pair of axially spaced arms 84 each having a recess 86 corresponding in cross-sectional configuration to approximately one-half of the container body. The container support means 38 further includes releasable retaining means 90 adjacent the cradle for holding the container in fixed relation to the cradle. The releasable retaining means 90 consists of a plate 92 extending upwardly from and fixed to the guide rods 82 with a non-metallic element 94 secured to one face thereof which is in juxtaposed relation to the cradle 80. The plate 92 and element 94 have a continuous opening 96 therein. The opening 96 defines a recess adjacent the cradle and the releasable retaining means 90 further includes means for producing a vacuum in said recess.

The vacuum in the recess 96 is created by attaching a vacuum source (not shown) to a flexible conduit 98 having one end threadedly received into one end of opening 99 which is an extension of the opening or recess 96. The opposite end of the conduit 98 received in an opening 100 in the flange 24 and this opening communicates with a bore 101.

The remainder of the mechanism for attaching a source of vacuum to the recess or opening 96 includes a ring 102 fixedly secured to a member 104 through bolts 106 with the member 104 being held in a fixed position on the support 14. The member 104 has a bore or opening 108 extending the entire length thereof along the axis of the shaft with a vacuum source (not shown) connected to the outer end of the opening. The ring 102 also has a bore opening 110 aligned with the opening 108. One surface 112 of the ring 102 is in constant engagement with surface 113 on flange 24 and has an elongated arcuate recess 114 which extends circumferentially along the ring or plate a distance less than the entire circumference thereof, as will be described hereinafter.

The surfaces 112 and 113 are maintained in contacting engagement with each other through an adjusting mechanism, which will now be described. The adjusting mechanism includes a hub 120 having one end in engagement with a spacer 122, the opposite end of which is in engagement with a split ring 124 (FIG. 2) received in a recess 126 in the shaft 12. The hub 120 has a plurality of adjustable screws 128 (FIG. 4) threadedly received in openings 130 in a flange 131 extending from hub 120 with the screws maintained in an adjusted position through lock nuts 132. Thus, the degree of engagement of the surfaces 112 and 113 can readily be set by adjustment of the set screws 128. If desired, suitable biasing means, such as springs, may also be interposed between the adjacent surfaces of hubs 28 and 120 to act as a biasing force in lieu of or in addition to the adjustment screws 128.

The container support mechanism 38 further includes drive means for producing relative movement between the container support means 80 and the backing member 36. The illustrated embodiment of the drive means for the container support means will be best understood by referring to FIGS. 1, 2 and 4. As shown in FIGS. 2 and 4, the respective guide rods 82 are slidably received in openings 140 respectively defined on the flanges 22 and 24 with the openings being aligned with each other. Suitable bearing means 142 may be interposed between the guide rods and the respective flanges.

The means for producing relative movement further includes a drive member 144 fixedly secured to the opposite end of the guide rods 82 with a pair of cam followers 146 secured to a bracket 148 connected to the ends of the rod. A pair of camming surfaces 150 are defined in axially spaced locations on the member 104 and receive the respective cam followers 146. The camming surfaces 150 are developed in such a manner that the cradle 80 and releasable holding means 90 are in a first position for receiving containers when the cradle passes the feed means 40; moves the cradle 80 and the releasable means 90 to a second position in which the container end is disposed within the opening 70, 76 in the backing member 36; and returns the container support means to the first position after the trimming operation has been completed to allow the container to be removed from the support means. A development of the camming surfaces will be described in more detail hereinafter.

Referring now to FIG. 3, the cutter and cutter support means 32 will now be described. The cutter support means includes a shaft 200 rotatably supported within a sleeve 202 which in turn is supported within an eccentric opening 204 defined in a circular member 206 which is supported within a bore 208 defined in the rotating member 18. The shaft 200 has an eccentric pin 210 extending from one end thereof with a cutter 212 supported on the pin 210 and retained thereon by a nut 214. The cutter is formed in two elements 212a and 212b interconnected by screws 215 with the element 212b having a conical outer surface 216 cooperating with element 212a to define a small shoulder 218, for a purpose which will be described later later.

The cutting section of each trimming station further includes means for rotating the shaft 200 to produce relative movement or rotation between the cutter and the backing member 36 for removing the salvage edge from the container, as will be described in more detail hereinafter. The drive means for the shaft 200 includes a gear 220 fixedly secured to the opposite end of the shaft 200 and in constant mesh with a fixed gear 222 defined on the periphery of a hub 224 (FIG. 2) which is secured to the upright fixed support 14 by bolts 226. Thus, rotation of the shaft 12 and the member 18 will cause relative rotation of the shaft 200 within the sleeve 202. To reduce the friction force opposing rotation between the sleeve 202 and shaft 200, suitable bearing means 228 may be interposed between opposite ends of the sleeve and the shaft.

The cutter support mechanism 34 further includes means for moving the cutter 212 axially and transversely of the opening 76, 70 in the backing member 36. This latter means includes first means for shifting the shaft 200 transversely of its axis between first and second positions and second means for axially shifting the shaft relative to the axis of the opening 70 when the shaft is in a predetermined position. The means for moving the shaft axially consists of a bracket 230 fixed to one end of sleeve 202 and rotatably supporting a rod 232 having cam followers 234 secured to the opposite ends thereof. The cam followers 234 respectively cooperate with opposed camming surfaces 236, 237 defined on members 238, 239 that are fixedly secured to the upright 114 by bolts 240 and interconnecting elements 241 for member 239. The two camming surfaces 236, 237 are developed in such a manner that the shaft (1) will be shifted axially towards the opening 70, 76 after the container end has been received in the opening, (2) maintain the cutter in the forward position while the salvage edge is being removed during rotation of the member 18 and (3) return the cutter to its original position after the cutting operation has been completed. A further discussion of the camming surfaces 236, 237 will be described in connection with the overall operation of the unit.

The means for moving the shaft transversely of the axis of the container 52 and the opening 70, 76 to position the cutter 212 in a first position where the cutter is aligned with the opening axis and a second position where the cutter is eccentric to the opening axis consists of an arm 250 fixedly secured to the sleeve supporting member 206 by bolts 252. The free end of the arm has a cam follower 254 rotatable thereon and cooperating with a camming surface 256 defined on the member 258. The camming surface is partially shown in FIG. 1 and has a major portion thereof concentric to the center of the shaft 12 so that the cutter support shaft will be located in a position concentric with the axis of the opening 70, 76, thereby rotating the cutter eccentrically of said axis. However, the camming surface 256 has a flattened or chordal portion arranged and developed in a manner that the sleeve support member 206 will be rotated within bore 208 to position the axis of the cutter 212 along the axis of the opening. This is accomplished as the cutter is moved across the first location or loading station L wherein containers are fed to each trimming station. Thereafter, the sleeve supporting member 206 is again returned to a second position, shown in FIG. 3, where the cutter axis is eccentric to the axis of the opening 70.

Each trimming station also includes means cooperating with the cutter to insure removal of the salvage edge from the edge. This means is shown as a plate 260 interposed between the backing member 36 and the cutter support with an opening 262 in plate 260 and corresponding in size to the opening 76. Thus, any salvage on the cutter will engage a surface of the plate 260 while the cutter passes through the opening in the plate to insure removal of the salvage from the cutter.

The remainder of the trimming device 20 includes drive means for driving the main shaft 12 and the drive mechanism 54 forming part of the feed means 40. The drive mechanism includes a drive shaft 270 (FIG. 2) supported for rotation on the uprights 14 through bearings 272. Shaft 270 has a sprocket 274 fixedly secured thereto and aligned with a second sprocket 276 forming part of the drive mechanism 54. A sprocket chain 278 is entrained over the two sprockets 274 and 276 while the shaft 270 is driven through a suitable motor 280.

The drive shaft has a further gear 281 keyed thereto and in constant mesh with a gear 282 fixed to the main shaft 12. Thus, operation of the motor 280 will produce synchronized rotation of the screw 42 on the feed mechanism and the shaft 12 which has the member 18 and the flanges 22 and 24 keyed thereto. With this arrangement, and an appropriate selection of pitch of the screw 42, the containers 52 will be sequentially fed to the loading station L as each cradle 82 passes the loading station L.

Figure 5:
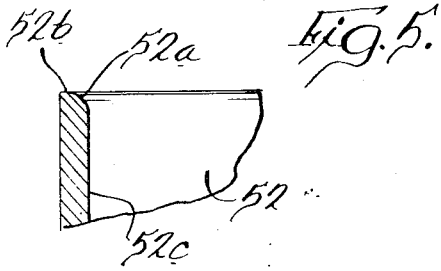
FIG. 5 is an enlarged fragmentary sectional view of a finished can.

The relative movement of the various parts for each of the trimming stations will now be described with particular reference to the schematic illustration of FIG. 5. Assuming the trimming device is rotating in a clockwise direction as viewed from the lefthand end of the shaft of FIG. 1, as a trimming station 32 approaches the loading station or first location, generally designated by the line L, the container support means is in a retracted position and the shaft 200 is being moved transversely of the axis of shaft 12 to locate the cutter 212 in axial alignment with the opening. When the cutter reaches the loading station L, which is defined by the path of movement of the containers through the feed means 40, the synchronized movement of the containers on the feed means will cause a container to be released from the lower end of drive screw 40 as the container support means for the cradle is located in alignment with the path of the containers. Just prior to the container support means reaching the loading station L, a vacuum will be applied to the conduit 98 at a point in the cycle of rotation designated by the line V so that the container will immediately be held in fixed relation on the cradle 80 by the vacuum source. During approximately the next 55° of rotation of the device 10, the cam followers 146 and cam surfaces 150 cooperate to move the container forwardly from the first position to a second position where the open end of the container is in the opening 70, 76 and the salvage edge extends beyond the edge 78. At approximately 30° from the loading station L, the camming surfaces 236, 237 are configured to shift the shaft 200 and sleeve 202 axially towards the open end of the container. At this time, the camming surface 256 and the associated cam follower 254 maintain the sleeve supporting member 206 in a second position wherein the axis of the cutter 212 is aligned with the axis of the opening 70, 76. Thus, the cutter is inserted into the open end of the container and the cutting edge is transversely aligned with the backing edge 78.

At approximately 75° from the loading station, the camming surface 256 is contoured to shift the axis of the cutter transversely of the axis of the container and the opening 70, 76 to locate the axis of the shaft 200 in alignment with the container center and the opening center thereby forcing the shoulder of the cutter into engagement with the inner wall of the container. This movememt occurs between the 45° and 90° locations from the loading station L. It should be noted that the cutter is located in its forwardmost position with the edge in transverse alignment with the backing edge 78 prior to the completion of the shifting of the cutter transversely of the axis of the opening. Such movement is completed approximately midway between the shifting of the cutter transversely into a cutting position.

During the next approximately 120°, the camming surfaces 236, 237 and 256 have a dwell portion to maintain the cutter in the cutting position. During such rotation of approximately 120°, the relative movement of the member 18 to the fixed gear 222 will cause rotation of the shaft 200 through gear 220 and trim the salvage edge from the end of the container. The cutting operation is completed as the trimming station reaches the line designated by the reference numeral C. It should be noted that according to one aspect of the invention, the configuration of the cutter elements 212a and 212b will produce an arcuate or radial surface 52a between the inner surface 52b and end surface 52c of the container wall as shown in FIG. 5, while the cutting operation is performed. This operation is at least some times called "burnishing."

During approximately the next 55° of rotation the camming surfaces 150 are contoured to return the container support cradle 80 to its retracted position shown in FIG. 2, and the camming surfaces 236, 237 are contoured to return the cutter 212 to its retracted position. Just prior to the container reaching the unloading station designated by the line U, the vacuum is released so as to allow the container to drop by gravity from the open cradle. It should be noted that the vacuum therefore is applied as the trimming station approaches the loading station and is removed as the trimming station reaches the unloading station to deposit the container at the unloading station. Stated another way, the circumferential extent of the recess 114 is approximately 275°, as shown in FIG. 5, and will thus produce a vacuum on the container during approximately two-thirds of each cycle of revolution of the trimming station.

While the trimming station is moved approximately 90°, between the unloading station and the loading stations, the shaft 200 is again shifted from a first position to a second position to align the axis of the cutter with the axis of the opening while the container support means and the shaft 200 are maintained in their fully retracted position by appropriate configuration of the camming surfaces 150 and 236, 237. When the trimming station approaches the loading station L, the vacuum is again applied to the conduit 98 and the operation is repeated.

The method of removing salvage edges by operation of the trimming device will now be briefly summarized. The motor 280 is operated to drive the shaft 270 at a constant speed thereby rotating shaft 12 and screw 42 in synchronized relation so that a container support means is disposed in the path of the containers as each container is released from the screw. At this time, the container support means is in the fully retracted position and the cutter is in a retracted position and axially aligned with the opening 70. Just prior to the container support means reaching the loading station L, the vacuum is applied to the recess 96 so that the container is immediately fixed within the cradle upon being deposited therein.

As the container moves from the first location or loading station L to the second station or unloading station U, the camming means 146 and 150 act as drive means to shift the container support means 38 and the container 52 axially of the opening 70 from a first position to a second position for a trimming operation and return the container support means to the first position after the trimming is completed. Also, during such movement between the two locations, the sleeve or support means 202 for the shaft 200 is shifted axially within the bore 208 to locate the shoulder or cutting edge 218 of the cutter in transverse alignment with the backing edge 78 by the positive drive means defined by cam means 234, 236 and 237. While such action is occurring, the cam means 254 and 256 cooperate to maintain the sleeve supporting member 206 in a position where the axis of the cutter 212 is aligned with the axis of the opening 70. As the cutter 212 approaches its forwardmost position, the cam means 254 and 256 cooperate to return the cutter to an eccentric position and during the entire time of this movement, the shaft 200 and the eccentric cutter are constantly being rotated by the gear 220 and the fixed gear 222. After the salvage edge has been completely removed, the container support and the cutter are returned to their retracted positions, and during such retraction, the cutter edge is moved in close proximity to the edge of the opening in plate 260 to remove the salvage edge which may be adhered to the cutting edge. The salvage edge then drops by gravity into the suitable collection trough (not shown).

From the above description, it will be seen that the present invention contemplates a method of trimming salvage edges from open ended containers which includes moving or rotating a member having a plurality of cutting stations along a path, feeding a continuous supply of cans along a second path intersecting with the first path to deliver a can to each of the stations. The cans are received on and supported in a fixed position at each station and surrounded with a backing member while a rotating cutter is inserted into the open ended container and positioned eccentrically to the axis of the container while constantly being rotated to automatically remove the salvage edge. To insert the cutter into the container, the cutter is shifted transversely of the axis to temporarily align the cutter axis and the opening axis and the cutter is moved axially of the container and the opening axis while being in axial alignment therewith. In addition, the inner edge of the cut end of the container is slightly deformed to produce an arcuate surface interconnecting the inner surface and the upper edge of the container end.

It will be appreciated that the present method and apparatus will therefore eliminate the possibility of producing an irregularity on the inner edge of the container wall or on the inner edge of the rim of the container because any imperfections on the container wall will normally occur as the cutter is breaking through the container wall. With the present arrangement, such imperfections, if any, will be produced on the outer edge and will be placed in compression to substantially reduce if not eliminate the tearing of the free edge of the rim during the flanging operation.

What is claimed is:

1. A method of trimming salvage edges from open ended cans comprising the steps of moving a member having a plurality of cutting stations along a first path; feeding a continuous supply of cans along a second path intersecting said first path to deliver a can to each station; supporting the cans at each station in a fixed position; moving said cans axially to surround the open end of each can with a backing member; rotating a cutter at each station eccentric to the axis of the can; temporarily aligning the cutter with the axis of the can and producing axial movement between the cutter and the can to transversely align the cutter with the backing member; and returning the rotating cutter to an eccentric position to engage the can wall and trim the salvage edge from the container.

2. A method as defined in claim 1, in which the member is rotated about an axis and the cutting stations are defined on the periphery of said member.

3. A method as defined in claim 2, in which the backing member for each station is rotated with the member and the can is axially shifted to surround the open end of the container with the backing member.

4. A method as defined in claim 3, in which the axial movement between the cutter and the can is produced by axially shifting the cutter towards the can.

5. A method as defined in claim 1 including the further step of deforming the inner edge of the free end of the container wall to an arcuate surface.

6. A method of automatically trimming salvage edges from open ends of containers comprising the steps of rotating a member having a plurality of circumferentially spaced cutting stations on the periphery thereof with each cutting station having a fixed backing member with an opening therein, a container support on one side and a continuously rotating cutter supported on the opposite side of the backing member; feeding containers to each container support at one location; moving said container support axially relative to said opening from a first to a second position towards the backing member to locate the end of the container in the opening; moving the rotating cutter axially relative to said opening from a first position to a second position to locate the cutter inside the container in transverse alignment with the backing member; shifting the rotating cutter transversely while it is in the second position to engage the container wall to remove the salvage edge from the container body; returning the container support to the first position at a second location; returning the cutter to a first position; and removing the container from said container support.

7. A method as defined in claim 6, in which the cutter is supported eccentrically on a rotating shaft and in which the shaft (1) is shifted transversely while in the first position to align the cutter with the axis of the opening at said first location, (2) is axially moved toward the backing member to the second position to locate the cutter in the container and (3) is transversely shifted into alignment with the axis of the opening to engage the container wall with the cutter.

8. A method as defined in claim 7, in which the container support and the shaft are cammed between said positions while said member is rotating.

9. A method as defined in claim 6, in which said cutter produces an arcuate surface on the inner edge of the container wall simultaneous with the removal of the salvage edge.

* * * * *